Aug. 12, 1969   E. A. LINK   3,461,419
HOT LINE CONNECTOR
Filed June 23, 1967   2 Sheets-Sheet 2
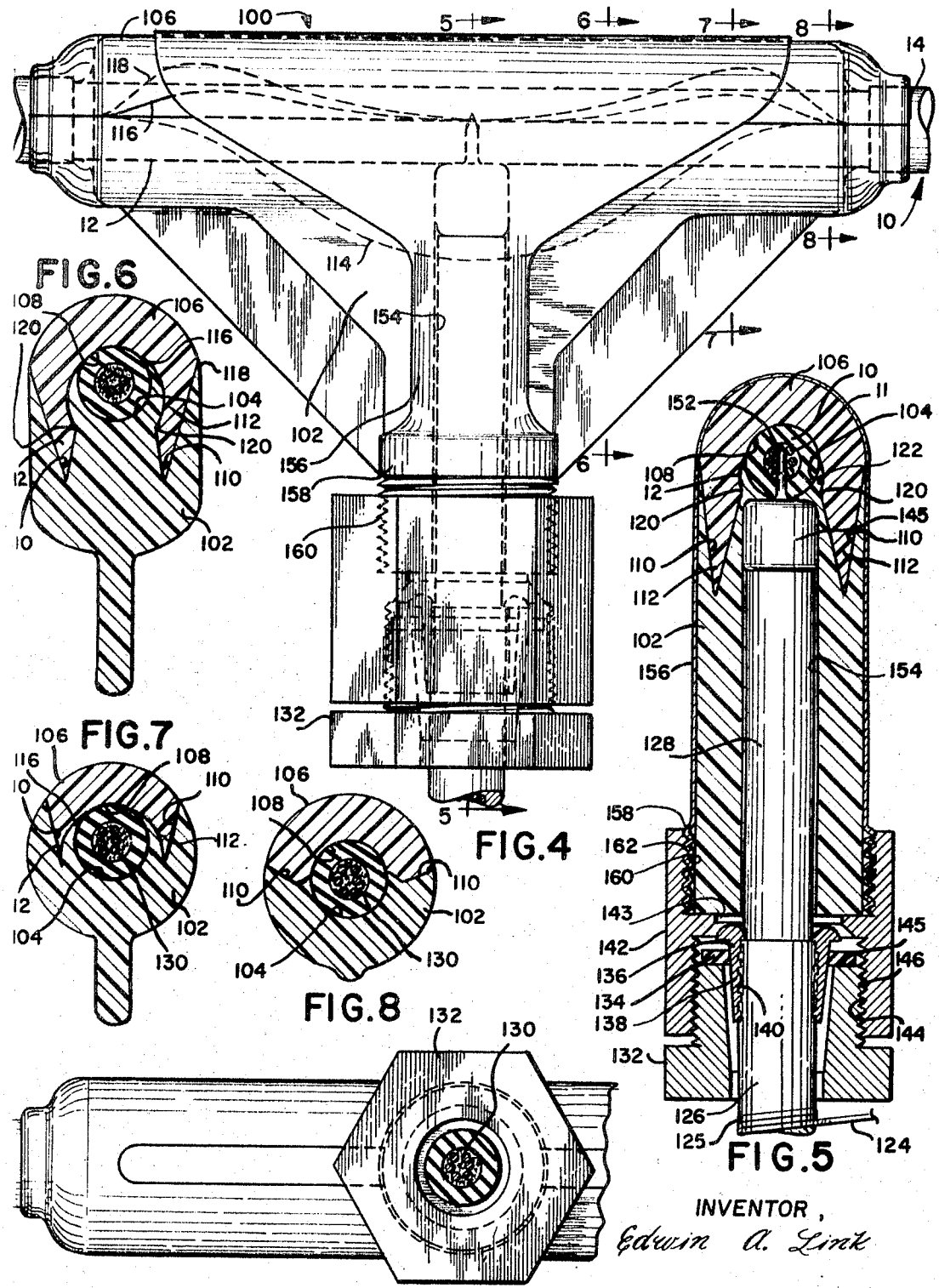
INVENTOR,
Edwin A. Link
By RONALD E. BARRY
Attorney

United States Patent Office 3,461,419
Patented Aug. 12, 1969

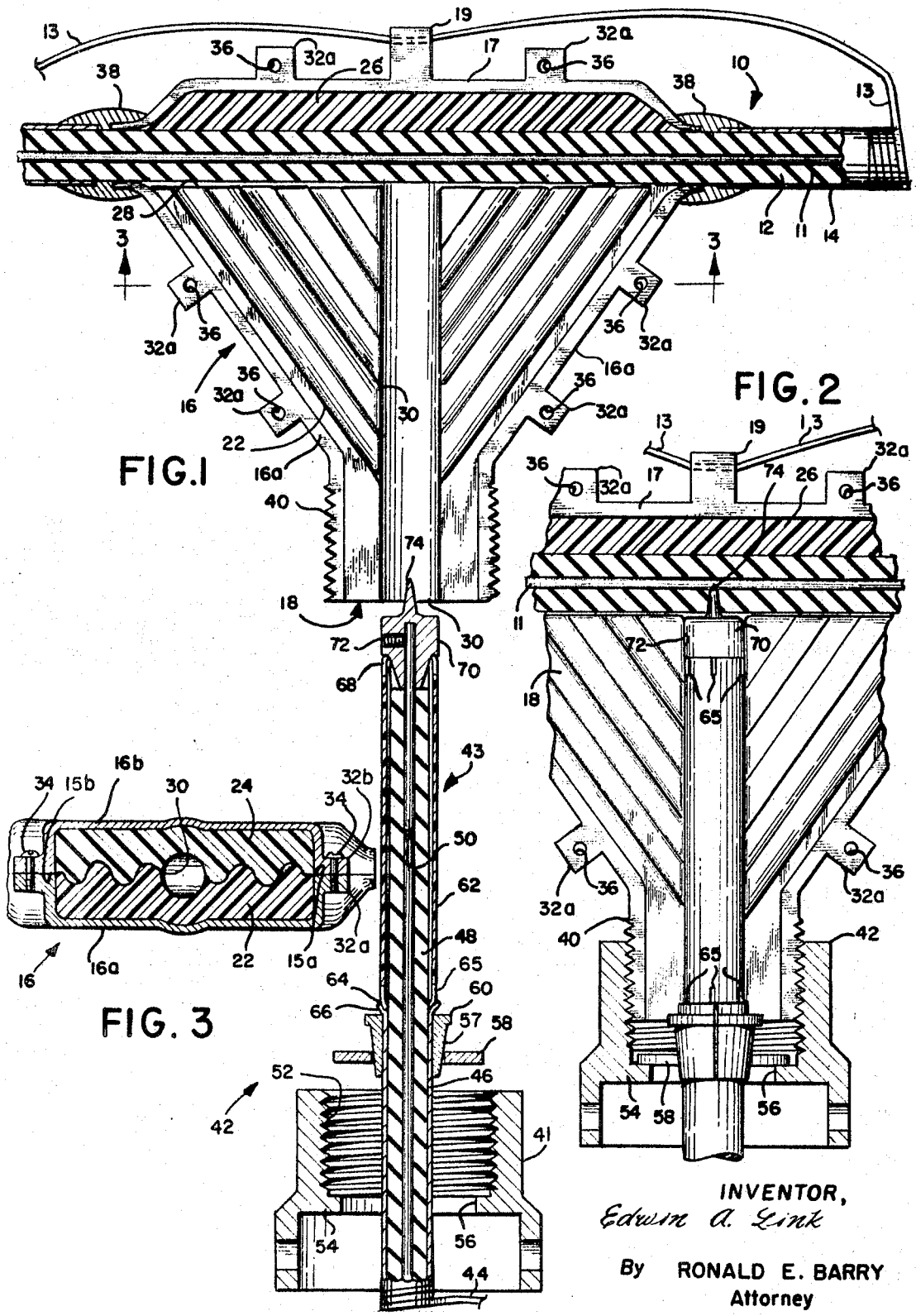

3,461,419
HOT LINE CONNECTOR
Edwin A. Link, Waukesha, Wis., assignor to RTE Corporation, Waukesha, Wis., a corporation of Wisconsin
Filed June 23, 1967, Ser. No. 648,406
Int. Cl. H01r 13/38, 13/54
U.S. Cl. 339—89          14 Claims

ABSTRACT OF THE DISCLOSURE

Disclosed herein is a tapping device including an insulator which can be used to enclose a section of a high voltage cable and a cable tap lead that is placed in a passage in the insulator and driven into electrical engagement with the cable.

BACKGROUND OF THE INVENTION

This invention relates to cable connecting devices and more particularly to an apparatus which can be used to tap an energized high voltage cable.

Underground electrical systems are normally designed to include cable junctions at all points in the system where service is anticipated. However, it often becomes necessary to make additional junctions after the system has become operative. Tapping an energized high voltage cable is dangerous and requires a high degree of caution in order to protect the linesman from harm. This normally requires that the cable be de-energized in order to add the new junction resulting in an objectionable disruption of service while the additional line is tapped into the de-energized cable.

SUMMARY OF THE INVENTION

One of the principal objects of the present invention is to provide a device which can be used to connect a cable lead to an energized cable without exposing the linesman to any dangers normally present when an energized cable is connected to the line.

Another object of the present invention is to provide a simple device for connecting a cable lead to a "hot line" or energized cable.

A further object of the present invention is to provide a device which insures that the cable will be electrically connected to the hot line cable.

A still further object of the present invention is to provide a device which can be used to connect a cable to a "hot line" or energized cable and can be left on the energized cable as an insulation for the connection.

A still further object is to provide a low cost cable junction which can be used to connect a junction line to the cable while the cable is energized.

Still another object of the present invention is to provide a positive connection between a cable and an energized cable.

Another object of the present invention is to provide a hot line cable tap that preinsulates and seals a cable lead prior to its connection with an energized cable.

These objects are accomplished by placing preformed dielectric insulating members around the section of the cable to be tapped. The insulated members are held in position on the cable section by a housing or clamp which also provides a means for aiding in driving a cable lead into the energized cable. The dielectric members are provided with a tap or probe passage which is aligned with the insulated cable section and assures that a tap or probe pushed into the passage intersects. A tap or probe is secured to the cable lead which is to be connected to the energized cable and a clamp and drive assembly is secured to the cable a predetermined distance from the tap or probe. The cable lead is then inserted into the tap or probe passage in the dielectric members and the clamp and drive assembly connected to the housing or clamp. The passage in the dielectric members is designed to sealingly engage the cable lead so that it is insulated when it is brought into engagement with the section of the cable to be tapped. The tap or probe is then forced into the cable. After termination has been completed the cable connector can be left on the energized cable and used as the insulation for the connection.

Other objects and advantages will become more readily apparent from the following detailed description when read in connection with the accompanying drawings in which:

FIG. 1 is a view of the hot line cable connector with the tap or probe separated from the connector housing.

FIG. 2 is a view partly in section showing the probe in the housing in electrical engagement with the high voltage cable.

FIG. 3 is a view taken on line 3—3 of FIG. 1 showing the sealed relation of the insulation.

FIG. 4 is a view of a modified form of the cable tap.

FIG. 5 is a sectional view taken on line 5—5 of FIG. 4.

FIG. 6 is a section view taken on line 6—6 of FIG. 4.

FIG. 7 is a sectional view taken on line 7—7 of FIG. 4.

FIG. 8 is a sectional view taken on line 8—8 of FIG. 4.

FIG. 9 is an end view of the modified cable tap shown in FIG. 4.

Referring to FIG. 1 of the drawing, high voltage cable 10 is shown having an electrical conductor 11 enclosed within cable insulation 12. The semi-conductive neutral 13 has been cut and unwound from a section of the cable to expose the cable sheath 14. The semi-conductive neutral should be bridged across the section of the cable to be tapped before it is cut. The cable sheath is then stripped from the cable insulation leaving the insulation exposed in the section where the tap is to be made. The cable shown has a semi-conductive neutral and a cable sheath but it should be apparent that the connector can be mounted on a cable that does not have the semi-conductive neutral and cable sheath.

The cable connector includes a housing 16 which is shown as being made in two identical sections 16a and 16b of a rigid material, either plastic or metal. Each section is shaped to matingly engage the other section along edges 15a and 15b to form a continuous outer surface. The housing sections are provided with a number of flanges 32a and 32b which are aligned when the housing sections are placed on the insulator. Screws 34 are screwed into threaded apertures 36 in the flanges to hold the housing sections together. Although screws 34 are shown to hold the housing sections together, any other means such as a clamp could also be used to accomplish the same result.

An insulator 18 made of a resilient or flexible dielectric material such as silicone rubber or an elastomer provides both an insulation and sealing means for the connector and is preformed to fit within the housing. The insulator is partially split to form overlapping sections 22 and 24 hingedly connected along one edge by section 26. A passage 28 is provided along the hinged connection to receive cable 10 and a passage 30 is provided in the overlapping flaps to receive and guide tap or probe 43. The mating surfaces of the overlapping flaps are corrugated as seen in FIG. 3 to provide a tight seal on either side of passage 30. Passage 30 intersects passage 28 at approximately its midpoint and acts as a guide for the cable tap or probe. The insulator is positioned on the exposed section of the cable by opening the flaps and wrapping the insulation around the cable. A quantity of silicone grease about the size of a baseball is placed in the passage 28 prior to mounting on the cable. The housing sections are then aligned on either side of the insulator and firmly locked together. It should be noted that the end of the housing sections are provided with threads 40 for connection to a clamp and drive assembly 42 mounted on cable lead 39 as described below. The housing sections could also be hingedly connected together along one of the edges if desired.

After the housing has been firmly clamped together a conductive tape 38 should be wrapped around the sheath on the cable and the housing to provide a continuous shield around the connection. If a plastic housing is used a conductive paint is applied to the outer surface of the housing to provide the continuous shield. The ends of the semi-conductive neutral are then connected together on lug 19 on the housing.

The end cable lead 39 is prepared for connection to the energized cable by unwinding the semi-conductive neutral 44 and stripping the semi-conductive shealth 46 away from the cable insulation 48 on the cable lead. The cable insulation is cut away from the end of the cable lead to expose electrical conductor 50.

The clamp and drive assembly 42 includes a collar 41 which is placed on the cable lead and moved back from the end of the cable lead. A washer 58 and a split ring 60 are also placed on the end of the cable lead and moved back from the end onto the cable sheath. The outer diameter of the washer is made larger than the diameter of the opening 56 in collar 41 so that flange 54 will abut the washer when the threaded section 52 of the collar 41 is screwed onto the threads 40 on the housing.

A sleeve 62 of a rigid plastic material such as polypropylene is pushed over the cable insulation on the end of the cable lead until the beveled end 64 of the sleeve is pushed beneath the end 66 of the semi-conductive sheath 46. Notches 65 should be cut in the end of the sleeve to allow for a greater amount of flexibility at the beveled end. The other end 68 of the sleeve should project beyond the end of the cable insulation on the cable. A proble or tap 70 is then placed on the exposed electrical conductor 50 and is secured to the conductor by a set screw 72. The end 74 of the probe has a sharp point which is used to puncture the insulation of the hot line cable and electrically engage electrical conductor 11. The end 74 of the probe or tap 70 could also be provided with a screw type thread and screwed into the insulation by turning the cable. The lower end of the probe is seated on the end 64 of the sleeve to form a rigid member from the probe to the end of the sleeve. The distance from the end 64 of the sleeve and the end 74 of the probe must be long enough to extend beyond the inner end of passage 30 and short enough to allow the threads 52 on the collar 41 to engage the threads 40 on the housing.

The split ring 60 is then moved up into tight engagement with the end of the sleeve 62 with the semi-conductive sheath clamped between the sleeve and the ring. The washer 58 is pushed up on the tapered section 57 of the split ring to squeeze the ring tightly against the cable and clamp it in position. The cable lead is then inserted into passage 30 in the insulator and pushed into the passage by hand as far as it will go. Collar 41 is then moved toward the probe until flange 54 engages washer 58 and is then pushed in far enough to allow the threaded section 52 of the collar to engage threads 40 on the housing sections. As the collar is screwed onto the housing it will force the end 74 of the probe through the cable insulation 12 on the cable and into the electrical conductor 11.

It should be noted that as the probe is pushed into the hot line cable there will be no exposed surface and all sections will be insulated and sealed. A Hot-Stick should be used to rotate the collar to eliminate any possible danger from exposure to any of the electrical circuits. Once the tap has been made it should not be used to make or break the connection while the lines are energized since no arc suppressing structure is provided in the cable connector.

Referring to FIGS. 4–9, a modified cable connector 100 is shown mounted on a high voltage cable 10. The cable has been prepared as described above by cutting and unwinding the semi-conductive neutral 13 and stripping of the cable sheath 14 from the cable insulation 12. The semi-conductive neutral should be bridged across the section to be tapped prior to mounting the connector 100 on the cable insulation.

In mounting the cable connector on the exposed cable insulation, base insulator 102 is placed against the exposed cable insulation with the cable aligned in semi-circular groove 104. A cap insulator 106 is placed on the opposite side of the exposed cable insulation with the cable aligned in semi-circular groove 108. The base and cap insulators are preformed of a resilient dielectric material similar to that described above.

As seen in FIGS. 5, 6, 7 and 8, the two grooves 104 and 108 in the insulators form a complete circle about the exposed cable insulation. Creepage is minimized by preforming a V-type indentation 110 along both sides of groove 104 on base insulator 102 and forming the two edges 112 of cap insulator 106 for mating engagement upon insertion into the two indentations 110. Since the effect of creepage is reduced as the distance increases from the point of electrical engagement, the depth of pentration of the edges 112 into the grooves 104 is reduced towards the ends of the insulators. This is shown by line 114 in FIG. 4 which indicates the depth of penetration of edges 112 into indentations 110. Line 116 in FIG. 4 represents the line of engagement of the grooves 104, 108 and line 118 is the line of engagement of the outer edges of the cap and base member. The cap and base member are held in tight engagement by providing a small indent 120 along both sides of the groove 104 with a corresponding ridge 122 being provided on the inside edges of the cap.

The end of the cable lead 125 which is to be connected to the high voltage cable is prepared by unwinding the semiconductive neutral 124 and stripping the semi-conductive sheath 126 away from the cable insulation 128 on the end of the cable. Cable insulation 128 is cut away from the end of the cable to expose electrical conductors 130. A collar 132 is placed on the cable lead and moved back from the end far enough to clear the cable sheath 126. A washer 134 is then placed on the cable and a tapered split ring 136 is positioned on the end of the cable shealth. The washer is pushed up onto the tapered section 138 of the ring to force the inner grooved surface 140 into tight engagement with the sheath. A cylindrical nut 142 having an internal thread 144 is then screwed onto the external thread 146 of the collar 132. The washer 134 will then be positioned between the end 145 of collar 132 and the flange 143 of nut 142.

A tap or probe 148 is secured to the electrically conductive member 130 by a set screw (not shown). The tap or probe has a pointed tip 152 which is capable of penetrating the cable insulation on the high voltage cable. The end of cable lead 125 is then inserted in passage 154 in base insulator 102 and forced inward as far as it will go. The passage has a diameter substantially equivalent to the outer diameter of the tap or probe to provide a seal as the probe is forced into the passage.

A U-shaped housing 156 is placed on the cap and base insulators with the lower end 158 of the housing encircling the end of the base insulator. The cylindrical nut has an internal thread 160 which is screwed onto thread 162 provided on the lower end 158 of the housing. As the cylinder nut is screwed onto the housing, the end 145 of collar 132 will abut washer 134 forcing it upward against the outer tapered surface of the split ring 136 forcing the tip 152 of the probe through the cable insulation 12 until it electrically engages the electrical conductor 11 on the high voltage cable.

The hot line tap is made in two sections, that is, a preinsulated sealing section and a tap or probe section for puncturing the high voltage cable. It is conceivable to mount the housing and insulation on the cable at the time the cable is laid. A cap or plug can be screwed onto the housing to prevent any foreign matter from entering the passage in the insulation. When a cable junction is to be made the plug is removed and a cable tap or probe inserted into the housing.

What is claimed is:

1. A cable connector for connecting the end of a cable lead to an insulated high voltage cable having a section of the cable insulation exposed, said connector comprising
   a resilient insulating member in sealing engagement with the exposed section of the high voltage cable to be tapped and having a passage intersected by the cable,
   a housing on said insulating member,
   electrically conductive cable penetrating means electrically and mechanically connected to the end of the cable lead and disposed in said passage in said insulating member in a position to be forced into the high voltage cable,
   clamp and drive means mounted on the cable lead and connected to said housing for forcing the end of the cable lead through said passage in said insulating member until said penetrating means electrically engages the high voltage cable.

2. A cable connector according to claim 1 wherein said cable penetrating means comprises,
   a tap type probe electrically connected to the end of said cable lead.

3. A cable connector according to claim 2 wherein said clamp and drive means includes a semi-rigid insulating sleeve mounted on the cable lead in abutting engagement with said probe,
   a clamp assembly mounted on the cable and abutting said sleeve and a threaded collar engaged with said clamp assembly and housing,
   whereby the longitudinal motion of said collar as said collar is screwed onto said housing will be transmitted to the probe by said sleeve.

4. A cable connector according to claim 3 wherein said clamp assembly comprises a tapered split ring mounted on the cable lead in a position to bear against the sleeve, and
   a washer engaged with said tapered ring to clamp it on the cable.

5. A hot line cable connector for connecting a cable lead to a high voltage cable having a section of the cable insulation exposed, said connector comprising
   a resilient insulating member mounted on said cable in sealing engagement therewith,
   said member being formed with a guide passage terminating at said high voltage cable,
   a cable penetrating probe secured to the end of said cable lead and positioned in said guide passage with said member sealingly engaging said cable lead about said passage,
   a housing mounted on said member,
   and clamp and drive means for advancing said probe in the passage and mounted on said cable lead and connected to said housing,
   whereby on connection of said clamp and drive means to said housing said probe will be forced through said passage into electrical engagement with said high voltage cable.

6. A hot line connector according to claim 5 wherein said clamp and drive means includes a collar having a threaded section
   and said housing is provided with a corresponding threaded section whereby the linear motion of the collar when screwed onto said housing forces said cable lead into electrical engagement with the cable.

7. A tap connector for directly connecting a cable lead to an insulated high voltage cable having a section of the cable insulation exposed, said connector comprising,
   a preformed insulator and sealing means mounted on the high voltage cable in sealing engagement with the section of the exposed insulation,
   an electrically conductive penetrating means mechanically and electrically secured to the cable lead,
   mechanical thrust means connected to said insulating and sealing means for driving said cable lead through said insulator and sealing means until the penetrating means electrically engages said high voltage cable.

8. A hot make tap according to claim 7 wherein said insulator and sealing means comprises
   a preformed insulating base and a preformed insulating cap,
   said base and cap forming
   a first passage sealingly engaging said cable, said base having a second passage to sealingly engage and guide said cable lead into engagement with the high voltage cable.

9. A hot make tap according to claim 7 wherein said mechanical thrust means includes
   a cable engaging ring assembly mounted on the cable lead and a threaded collar positioned on the cable lead in a position to engage the ring assembly,
   said collar being connected to said insulator and sealing means to force the probe into engagement with the cable as the collar is secured to the insulator and sealing means.

10. A cable connector for electrically connecting the electrically conductive end of a cable lead to the electrically conductive member of a high voltage cable having the cable insulation exposed, said connector comprising
    an electrically conductive probe secured to the electrically conductive end of the cable lead,
    a resilient member having a first passage for sealing engagement with the exposed section of the cable and a second passage transverse to said first passage for sealing engagement with the cable lead,
    and means for driving the cable lead through said second passage until said probe penetrates the cable and electrically engages the conductor.

11. A cable connector according to claim 10 including means for electrically shielding said member.

12. A cable connector according to claim 11 wherein said shielding means comprises
    a housing formed from an electrically conductive material.

13. A cable connector according to claim 11 wherein said shielding means comprises
    a housing and
    an electrically conductive paint on the outer surface of said housing.

14. A cable connector according to claim 10 wherein said drive means includes a cable engaging ring assembly mounted on the cable lead,
    a threaded collar positioned on the cable lead in a position to engage said ring assembly and
    a housing mounted on said member and having a threaded section to threadedly receive said collar.

References Cited

UNITED STATES PATENTS

| | | | |
|---|---|---|---|
| 2,196,964 | 4/1940 | Lee | 339—97 |
| 2,694,183 | 11/1954 | Edlen et al. | |
| 2,805,399 | 9/1957 | Leeper. | |
| 3,379,824 | 4/1968 | Kempf. | |
| 3,380,014 | 4/1968 | Schenker et al. | 339—97 |

FOREIGN PATENTS 455,196 10/1936 Great Britain.

LARAMIE E. ASKIN, Primary Examiner

U.S. Cl. X.R.

174—71, 92; 339—97